Figure 2:

O. E. Greene.
Lubricating Sleeve.
N° 89,038. Patented Apr. 20, 1869.
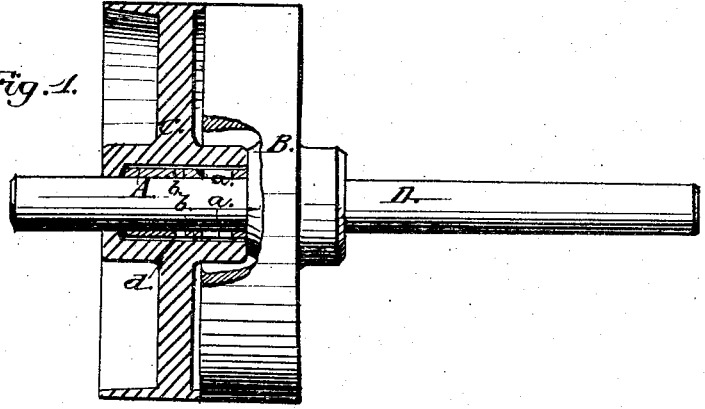

Witnesses:
W. M. Dennis.
Wm. H. Seaman.

UNITED STATES PATENT OFFICE.

OLIVER E. GREENE, OF LAWRENCE, MASSACHUSETTS.

*Letters Patent No. 89,038, dated April 20, 1869.*

IMPROVED LUBRICATING-SLEEVE FOR LOOSE PULLEYS.

The Schedule referred to in these Letters Patent and making part of the same.

*To all whom it may concern:*

Be it known that I, OLIVER E. GREENE, of Lawrence, Essex county, in the State of Massachusetts, have invented an Improved Lubricating-Device, which I call a lubricating-sleeve; and I hereby declare the following to be a full and exact description thereof, reference being had to the accompanying drawings, forming part of this specification.

The nature or essence of my invention consists in placing upon a shaft, or axle, on which a loose pulley, or wheel is to turn, a hollow cylinder, or loose sleeve, so that the pulley, or wheel may have this sleeve within it when placed upon the shaft, and may turn upon it, or turn with it, as may happen; also in making a number of holes, or slots in or through said sleeve, to facilitate lubrication.

In the following description of my invention, the drawings hereinbefore mentioned will be referred to, Figure 1 being a view of a fast pulley and loose pulley on the same shaft, partly sectional, and Figure 2, a view of the sleeve.

In these drawings—

D is a shaft, having on it the fast pulley B and the loose pulley C.

Within the hub of the pulley C is the loose sleeve A, occupying a space between the hub or box and the shaft, and free to turn along with the pulley, or to turn somewhat slower than the pulley, or to remain stationary on the shaft while the pulley turns on it, according to the degree of friction between the different parts.

The pulley C has an opening, or passage, $d$, for the introduction of oil, and the sleeve A is pierced with a number of holes, $b\ b$, directly under or opposite to the passage $d$, so that oil poured into this passage may fill the holes $b$, and spread between the sleeve and the shaft, and between the hub and sleeve.

A number of slots, $a\ a$, is made in or through the sleeve, at different points, to receive any surplus oil, so that instead of working out, it may be held in reserve in these until wanted, when it will spread, and come into use.

The holes $b$ will also perform the same office, and as many slots or holes, or both, may be made in the sleeve as may be deemed necessary or useful.

If the shaft, or axle be tapering, as is commonly the case with carriage-axles, the interior of the sleeve should conform to the shape of the axle, and the exterior to the shape of the hub, or box, whether straight or tapering.

The foregoing being a description of my invention,

I claim a lubricating-cylinder, or sleeve, arranged between the shaft, or axle and the hub of the pulley, or wheel, and fitted to turn freely on the shaft, and in the hub, substantially as described.

I also claim perforating the cylinder, or sleeve, arranged to turn freely between the shaft, or axle and the hub of the wheel, or pulley, substantially as described, for the purpose set forth.

OLIVER E. GREENE.

Witnesses:
NELLIE A. JOPLIN,
WILLIAM D. JOPLIN.